United States Patent [19]

Cuisia et al.

[11] Patent Number: 5,244,600
[45] Date of Patent: Sep. 14, 1993

[54] METHOD OF SCAVENGING OXYGEN IN AQUEOUS SYSTEMS

[75] Inventors: Dionisio G. Cuisia, Buffalo Grove; Chih M. Hwa, Palatine; Murrell L. Salutsky, Highland Park, all of Ill.

[73] Assignee: W. R. Grace & Co.-Conn., New York, N.Y.

[21] Appl. No.: 844,034

[22] Filed: Mar. 2, 1992

[51] Int. Cl.$^5$ ............................................. C23F 11/12
[52] U.S. Cl. ................ 252/396; 252/188.28; 252/389.61; 252/389.62; 252/400.62; 252/407; 252/400.61; 422/17
[58] Field of Search ............ 252/188.28, 396, 389.61, 252/389.62, 400.61, 400.62, 407; 422/17

[56] References Cited

U.S. PATENT DOCUMENTS

| | | | |
|---|---|---|---|
| 2,529,178 | 11/1950 | Nieland et al. | 252/180 X |
| 3,110,684 | 11/1963 | Miller | 252/389.3 |
| 3,256,203 | 6/1966 | Robertson et al. | 252/178 |
| 3,589,859 | 6/1971 | Foroulis | 252/396 X |
| 3,699,047 | 10/1972 | Petrey et al. | 252/87 |
| 3,711,246 | 1/1973 | Foroulis | 252/389.2 X |
| 4,108,790 | 8/1978 | Foroulis | 252/396 X |
| 4,279,768 | 7/1981 | Busch | 252/180 |
| 4,512,915 | 4/1985 | Lumaret et al. | 252/389.2 |
| 4,975,219 | 12/1990 | Sato et al. | 252/389.62 X |
| 5,169,563 | 12/1992 | Katayama et al. | 252/389.53 |

FOREIGN PATENT DOCUMENTS 1434804 5/1976 United Kingdom .
1459390 12/1976 United Kingdom .

OTHER PUBLICATIONS

*Nace Basic Corrosion Course* (11th printing) pp. 7-15 to 7-17.
*Organic Chemistry*; Boyd et al., 3rd edition p. 674.

Primary Examiner—Robert L. Stoll
Assistant Examiner—Valerie Fee
Attorney, Agent, or Firm—James P. Barr

[57] ABSTRACT

A method for inhibiting or preventing corrosion of metals in contact with an aqueous system containing dissolved oxygen comprising adding to the system an oxygen scavenger having the formula

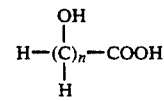

wherein n is 5 or 6, lactone derivatives thereof, or its water soluble salts, in an amount effective to substantially remove the dissolved oxygen.

5 Claims, No Drawings

METHOD OF SCAVENGING OXYGEN IN AQUEOUS SYSTEMS

FIELD OF THE INVENTION

This invention relates to the addition of oxygen scavengers to aqueous systems to reduce the corrosion of metals that are in contact with the aqueous system, and more particularly to the use of certain oxygen scavenging compositions which comprise hydroxycarboxylic acids and related compounds.

BACKGROUND OF THE INVENTION

The corrosion of metal surfaces which are in contact with aqueous systems is a common problem. Corrosion may occur in various locations including boiler feedwater lines, heaters, steam lines, process tanks and return lines. Dissolved oxygen in the aqueous system is often a principal factor influencing the formation of the corrosion, particularly where iron and steel are the materials of construction. The corrosion of iron based metals in conventional boiler systems is a well known problem, and controlling the presence of oxygen in boiler systems, particularly in the feedwater section has received considerable attention. Oxygen removal may be partially accomplished by either vacuum or thermal deaeration, or both. Complete removal of oxygen cannot be effected by these means, however, and further removal by use of a chemical oxygen scavenging agent, such as sodium sulfite, has been a customary practice.

Recently, the use of low pressure boilers (i.e. those operating below about 150 psig) has been increasingly supplanted by the use of boilers operating at moderate pressure (i.e. operating between about 150 psig and about 600 psig) and high pressure (i.e. operating above about 600 psig). As boiler operating temperatures and pressures have increased, there has been particular interest in the performance of chemical oxygen scavengers which are effective at these operating conditions. The use of sulfites at elevated temperatures and pressures has been known to result in the formation of sulfur dioxide and hydrogen sulfide, which can be a source of corrosion. Other scavenging agents such as hydrazine, hydroquinone, and certain hydroxylamines have been found to perform satisfactorily in some circumstances. For example, U.S. Pat. No. 4,278,635 to Kerst discloses the use of various dihydroxy, diamino, and amino hydroxy benzenes and their lower alkyl substituted derivatives, and particularly hydroquinone, as corrosion control agents in boiler systems. U.S. Pat. No. 4,282,111 to Cuiba also relates to the use of hydroquinone to reduce the oxygen content of an aqueous medium. U.S. Pat. No. 4,363,734 to Solvinsky discloses the use of hydroquinone as a catalyst in combination with dihydroxy acetone. Japanese Patent Publication No. SHO 51-93741 by Suzuki et al reports synergistic inhibition of metallic corrosion by combinations of dihydroxybenzenes (e.g. hydroquinone and methyl hydroquinone) and various carboxylic acids in boiler water systems. In other circumstances, the efficiency with which the scavenging proceeds has not been optimal. There is thus a continuing need for alternative oxygen scavengers which can be effectively used at elevated temperatures and pressures.

U.S. Pat. No. 2,170,596 to Ouiggle describes oxygen absorbing solutions using catalysts such as various quinones together with reducing agents such as reducing sugars like glucose. U.S. Pat. No. 1,988,823 to Winning et al describe rust remover compositions which comprise ammonium salt, an alkali salt of a water soluble organic acid, sugar, and an inhibitor of corrosion such as pyrogallol, hydroquinone, pyridine or quinoline.

Gluconic acid and its salts have been used for corrosion control. U.S. Pat. No. 2,529,178 to Nieland et al discloses the use of gluconates such as sodium gluconate to protect metals, particularly ferrous metals, from corrosion in water systems. This patent describes the formation of a protective layer on the metal surface when certain amounts of the gluconate are added to the water in the system.

U.S. Pat. No. 3,589,859 to Foroulis discloses that gluconate salts, particularly when used in combination with a benzoate or a salicylate salt, inhibits the oxidative corrosion in aerated cooling systems. U.S. Pat. No. 3,711,246 to Foroulis is directed to inhibiting oxidative corrosion in an oxygen-containing cooling water system using certain inorganic silicate salts together with certain gluconate salts, optionally with certain polyphosphates.

DETAILED DESCRIPTION

The present invention is directed to a method for inhibiting or preventing corrosion of metal surfaces which are in contact with aqueous systems containing dissolved oxygen and more particularly to the use of corrosion inhibiting oxygen scavengers comprising watersoluble hydroxycarboxylic acids having the general formula:

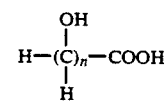

wherein n is either 5 or 6, the various lactone derivatives of these acids and the water soluble salts of said acids and lactones.

The preferred oxygen scavengers of this invention are gluconic acid and glucoheptonic acid or their water soluble salts.

The method of this invention comprises adding to an aqueous system which contains dissolved oxygen at least one compound having the above general formula in an amount effective to remove or control the presence of the oxygen in the system.

The oxygen scavengers of this invention are suitable for use in low, moderate or high pressure boiler systems, and may also be utilized in other systems where aqueous solutions containing dissolved air and/or oxygen are in contact with metal surfaces. The precise dosage used in each system may vary somewhat depending on the oxygen content of the water as well as other characteristics of the water system. In general, the dosages range from 0.001 ppm to 500 ppm, and are preferably in the range of from 0.01 ppm to 100 ppm.

The oxygen scavengers of this invention may be used as the sole oxygen scavenger for treating the aqueous system, or other conventional oxygen scavengers such as diethyl hydroxylamine, hydrazine, and the like, may be used in combination therewith. In addition, the oxygen scavengers of this invention may be used in combination with other conventional water treating agents including, but not limited to pH regulators, biocides, dispersants, chelants, corrosion inhibitors, scale inhibitors, polymeric agents, and the like, and mixtures thereof.

Without further elaboration, it is believed that one of ordinary skill in the art, using the preceding detailed description, can utilize the present invention to its fullest extent.

The following examples are provided to illustrate the invention in accordance with the principles of this invention, but are not to be construed as limiting the invention in any way except as indicated in the appended claims. All parts and percentages are by weight unless otherwise indicated.

EXAMPLE 1

This example demonstrates the oxygen scavenging activity of the hydroxycarboxylic acids of this invention under boiler conditions at 400 psig and 448° F. During the test, the boiler feedwater was saturated with dissolved oxygen by continuous aeration. The concentration of dissolved oxygen in the feedwater ranged from 8.5 ppm to 9.5 ppm as $O_2$. The boiler steam was condensed through a heat exchanger producing a condensate temperature of 55° F. The condensate was then passed through a chamber in which an oxygen probe was inserted to monitor the concentration of dissolved oxygen. A blank run (i.e. without an oxygen scavenger) was first conducted until a constant oxygen reading was obtained. Once the initial dissolved oxygen reading had been established, the oxygen scavenger being evaluated was fed into the boiler. The reduction of the dissolved oxygen in the condensate was then recorded. The boiler feedwater contained 10 ppm total hardness (as $CaCO_3$). Table 1 illustrates the extent of oxygen removal in the stream condensate 30 minutes after the addition of the oxygen scavenger. Sodium sulfite and hydrazine were included in the evaluation for comparison purposes.

TABLE 1

| Oxygen Scavenger | Active Dosage ppm | Dissolved Oxygen (ppm) in the Condensate Initial | Dissolved Oxygen (ppm) in the Condensate Final | % Oxygen Removal |
|---|---|---|---|---|
| Sodium Sulfite | 80 | 2.7 | 0.1 | 96.3 |
| Hydrazine | 40 | 2.7 | 0.2 | 92.6 |
| Hydrazine | 80 | 2.7 | 0.1 | 96.3 |
| Sodium Glucoheptonate | 80 | 2.2 | 0.3 | 86.4 |
| Sodium Glucoheptonate | 160 | 1.9 | 0.1 | 94.7 |
| Sodium Gluconate | 160 | 2.7 | 0.3 | 88.9 |

We claim:

1. A method for inhibiting or preventing corrosion, due to oxygen, of metals in contact with an aqueous boiler water system containing dissolved oxygen consisting essentially of adding to the system in an oxygen scavenging effective amount an oxygen scavenger having the formula:

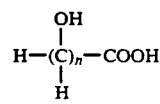

wherein n is 6, lactone derivatives thereof, or its water soluble salts.

2. A method according to claim 1 wherein the oxygen scavenger is glucoheptonic acid.

3. A method according to claim 1 wherein the effective amount of oxygen scavenger added to the system is in the range of from 0.001 ppm to 500 ppm.

4. A method according to claim 1 wherein the effective amount of oxygen scavenger added to the system is in the range of from 0.01 ppm to 100 ppm.

5. A method according to claim 1 wherein the boiler system operates at a temperature in the range of from 298° F. to 696° F. and at a pressure in the range of from 50 psig to 3000 psig.